July 26, 1960     S. J. CONVERY ET AL     2,946,138
EDUCATIONAL TEST FOLDER FOR TEACHING ARITHMETIC
Filed Aug. 17, 1959     2 Sheets-Sheet 1

INVENTORS
SUE J. CONVERY and
BY    RITA CONVERY

*Flehr & Swain*
ATTORNEYS

July 26, 1960      S. J. CONVERY ET AL      2,946,138
EDUCATIONAL TEST FOLDER FOR TEACHING ARITHMETIC
Filed Aug. 17, 1959      2 Sheets-Sheet 2

| NAME John Smith | ADDITION TEST III | CHECK USE |
|---|---|---|
| GRADE 3 DATE Sept. 10, 1959 | | INVENTORY TEST ✓ |
| FACTS TESTED 35 CORRECT | | TEST AFTER STUDY |

| 3 +8 | | 2 +9 | | 7 +7 | | — | | — | |
|---|---|---|---|---|---|---|---|---|---|
| — | | — | | 8 +4 | | — | | — | |
| — | | 8 +3 | | 6 +7 | | — | | — | |
| — | | — | | — | | — | | — | |
| — | | 6 +8 | | — | | — | | — | |
| — | | — | | — | | — | | — | |
| — | | — | | — | | 8 +6 | | 9 +8 | |

IN THIS SECTION COPY, WITH CORRECT ANSWERS THE NUMBER FACTS WHICH YOU OMITTED OR MISSED

| + | + | + | + | + | + |
|---|---|---|---|---|---|
| + | + | + | + | + | + |

TEAR OFF AT PERFORATION AND KEEP FOR FURTHER STUDY.
ADDITION TEST III

*F I G. 3*

INVENTORS
SUE J. CONVERY and
RITA CONVERY
BY
Flehr & Swain
ATTORNEYS

_United States Patent Office_

2,946,138
Patented July 26, 1960

2,946,138

EDUCATIONAL TEST FOLDER FOR TEACHING ARITHMETIC

Sue J. Convery, 1761 16th Ave., and Rita Convery, 885 Head St., both of San Francisco, Calif.

Filed Aug. 17, 1959, Ser. No. 834,139

6 Claims. (Cl. 35—48)

This invention relates to an educational device and more particularly to such an educational device for teaching arithmetic.

It is still necessary for students in arithmetic to learn the fundamental arithmetic combinations or facts. Educational devices heretofore provided to facilitate learning of these basic combinations have been difficult for students to utilize and also have been difficult to correct. There is, therefore, a need for an educational device which can be readily used by the teacher and the students to help the students in learning the fundamental arithmetic combinations.

In general, it is an object of the present invention to provide an educational device to facilitate the teaching and learning of the basic arithmetic combinations.

Another object of the invention is to provide an educational device of the above character which is simple and easy to use.

Another object of the invention is to provide an educational device of the above character in which the test sheet can be readily used by the student.

Another object of the invention is to provide an educational device of the above character in which the answers on the test sheet can be readily corrected.

Another object of the invention is to provide an educational device of the above character in which the problems incorrectly solved can be copied onto the lower portion of the test sheet with correct answers and separated from the test sheet for further study.

Another object of the invention is to provide an educational device of the above character which can be utilized by a student independently or by students in a group.

Another object of the invention is to provide an educational device of the above character which will encourage a student to locate his weakness in the fundamental combinations by giving him the material with which to correct his difficulties.

Another object of the invention is to provide an educational device of the above character with which parents of the students can help them with their most difficult arithmetic problems.

Additional objects and features of the invention will appear from the following description in which the preferred embodiment has been described in detail in conjunction with the accompanying drawings.

Referring to the drawings:

Figure 3 is a plan view of the test sheet.

Figures 1, 2:
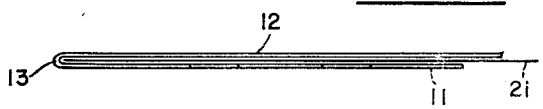
Figure 1 is a plan view of an educational device incorporating the present invention.
Figure 2 is a cross-sectional view taken along the line 2—2 of Figure 1.

In general, our educational device consists of a backing member of relatively stiff material with a cover member of similar material hinged to the backing member for swinging movement to and from a position overlying the backing member. The cover member is provided with a plurality of spaced sight openings. Indicia are disposed above or below the sight openings and constitute problems. Identical indicia constituting identical problems are disposed on the sides of the problems above the sight openings. The last named problems are provided with answers which are disposed on the sides of the sight openings. A removable test sheet adapted to be inserted between the backing member and the cover member is provided. It bears indicia constituting problems identical to those on the cover member. These are the problems to be solved by the student. Spaces below or above the indicia are provided for answers to the problems. After the student has answered the problems, the test sheet is placed under the cover member and the answers checked with the answers appearing on the cover member. All incorrect answers are marked through the sight openings. The test sheet is provided with a separate portion which can be detached from the test sheet. This separate portion carries spaces in which the student can copy the problems he has missed with the correct answers. The student can then utilize this separate portion for further study.

More in particular, the educational device consists of a backing member 11 of relatively stiff material and a cover member 12 also formed of a relatively stiff material hinged to the backing member 11 for swinging movement to and from a position overlying the backing member. For example, as shown in the drawing, the backing member 11 and the cover 12 can be formed of a single sheet of relatively stiff material which has been folded along the line 13 so that the cover 12 is hinged at its left-hand margin. The backing member 11 is preferably substantially rectangular as shown. The cover member 12 is substantially square as shown to expose the lower extremity of the backing member 11.

The cover member 12 is provided with a plurality of sight openings 16 which are spaced in horizontal and vertical rows. Indicia 17 are disposed on the cover above or below the sight openings and constitute problems which are to be solved. In multiplication, addition and subtraction, the indicia are disposed above the sight openings, whereas in division the indicia are disposed below the sight openings. Additional indicia 18 are disposed on the cover member 12 and are identical to the indicia 17. The additional indicia are disposed on one side of the indicia 17 and preferably on the right side as shown in Figure 1. The indicia 18 constitute problems identical to the problems 17 with the exception that they include answers to the problems. The indicia 17 and 18 are in general alignment so that the answers to each of the problems are disposed on one side of the sight opening 16 and preferably on the right side of the sight opening 16 as shown in the drawing.

It will be noted that the problems shown on the cover member 12 are problems in addition. However, it is readily apparent that, if desired, problems in subtraction, multiplication and division can also be placed on the cover member.

A test sheet 21 is provided and is preferably formed of a sheet of material such as paper. The test sheet bears indicia 22 as shown in Figure 3 which constitute problems. The indicia are arranged in rows in the same manner as the indicia 17 on the cover sheet. Spaces 23 are provided below the indicia for answers to the problems. The test sheet has a bottom portion or lower section 24 which is delineated from the remainder of the test sheet by a perforated tear line 26. This bottom section contains a plurality of spaces 27 for copying problems with correct answers which were missed as hereinafter described. It will be noted that the cover member 12 is sized so that the lower section 24 of the test sheet is exposed to facilitate copying of the problems incorrectly solved with correct answers.

In utilizing the educational device, the test sheets are first given out to the students by the teacher. The student then completes the test by writing in the answers to the problems directly onto the test sheet. After the students have completed the test, the students are handed the study-check-correction folder comprised of the cover member 12 and the backing member 11. The student then raises the cover member 12 and places the test sheet facing upwardly on the backing member 11. Thereafter, the student allows the hinged cover member 12 to drop over the test sheet. The test sheet is then positioned so that the written answers to the problems on the test sheet appear in the viewing or sight openings 16. The student then checks his answers with the answers which appear to the right to see which of the problems he has answered correctly. All wrong or omitted answers are marked with an "X" through the sighting opening or windows as shown As soon as the student has completed the test, he grades himself by placing the number of correct answers in the space provided for the same on the test sheet. Thereafter, the student copies onto the lower section of the test sheet the omitted or incorrectly solved problems with correct answers into the spaces 27. After this has been done, he tears off the lower section of the test sheet along the perforated line 26. This section may then be taken by the student and studied at periodic intervals. With this record, the students can be tested orally or in writing by a schoolmate, teacher or parent.

The study-check-correction folder can then be collected by the teacher for use by the next class. It has been found that all 390 of the fundamental arithmetic combinations can be compiled in a set of twelve study-check-correction folders. Thus, it is possible to check the students on all the combinations with very little effort.

Use of the educational device is advantageous because it requires no copying or dictating of test questions. Answers to problems need not be written through windows, nor is there any copying of answers from test papers to answer cards. In addition, it is not necessary for the child to check answers from an answer book or blackboard far removed from the answer written by the child on the test paper. The student cannot lose his place in trying to follow answers called by a teacher. In addition, the educational device eliminates time consuming, nonproductive correction of hundreds of answers by the teacher.

The device is designed and constructed for repeated use by one child or by several children in succession. The study-check-correction folder can be used for pre-study survey or inventory tests or for post-study achievement tests. If desired, the front side of backing member can be provided with a sample test sheet. The reverse side can be used for additional study material.

With a complete set of tests, a teacher can continually and recurrently check the children in their basic fundamentals of arithmetic in grades 3 through grades 7 and 8. Individual weaknesses can be readily determined by the student. By utilizing the tear-off sections or portions of the test sheet, the student can remedy these weaknesses by enlisting the aid of his parents or other children to repeatedly check him on the problems which he has missed. In this manner, every child can become well schooled in the fundamental arithmetic combinations.

We claim:

1. In an educational device, a backing member of relatively stiff material and a cover member of relatively stiff material hinged to said backing member for swinging movement to and from a position overlying the backing member, the cover member being provided with a plurality of spaced sight openings formed therein, said cover member bearing indicia adjacent the sight openings and constituting problems, said cover member also bearing additional indicia constituting problems identical to said first-named problems and answers to the problems, the identical problems being positioned side-by-side so that the answers to the problems are disposed on one side of the sight openings underlying the problems.

2. An educational device as in claim 1 together with a removable test sheet bearing indicia constituting problems identical to the problems on the cover member, the test sheet being provided with spaces adjacent the problems for answers to the problems, the indicia and the spaces for the answers to the problems being so positioned that the spaces for the answers to the problems on the test sheet are disposed below the sight openings in the cover member when the test sheet is disposed between the cover member and the backing member.

3. An educational device as in claim 2 wherein said test sheet is provided with a removable bottom portion, the bottom portion containing spaces for problems missed on the test sheet with correct answers.

4. In an educational device, a backing member of relatively stiff material and a cover member of relatively stiff material hinged to said backing member for swinging movement to and from a position overlying the backing member, the cover member being provided with a plurality of spaced sight openings formed therein, the openings being aligned in vertical and horizontal rows, said cover member bearing indicia disposed above the sight openings and constituting problems, said cover member also bearing additional indicia constituting problems identical to said first-named problems and answers to the problems, the identical problems being positioned side-by-side so that the answers to the problems are disposed on one side of the sight openings underlying the problems, and a test sheet disposed between the cover member and the backing member, the test sheet bearing indicia constituting problems identical to the problems on the cover member, the test sheet being provided with spaces underlying the problems for answers to the problems, the indicia and the spaces for answers to the problems being so positioned that the spaces for the answers to the problems on the test sheet are disposed below the sight openings in the cover member.

5. An educational device as in claim 4 wherein said test sheet is provided with a removable bottom portion, the removable bottom portion being connected to the remaining portion of the test sheet by a perforated tear line, the bottom portion containing spaces for problems missed on the test sheet with correct answers.

6. An educational device as in claim 5 wherein said cover member is smaller than said backing member so that the bottom portion is exposed.

References Cited in the file of this patent

UNITED STATES PATENTS

| | | |
|---|---|---|
| 1,617,657 | Studebaker | Feb. 15, 1927 |
| 2,213,225 | Maggioni | Sept. 3, 1940 |
| 2,503,130 | Poritz | Apr. 4, 1950 |
| 2,879,608 | Watkins | Mar. 31, 1959 |
| 2,919,498 | Hill | Jan. 5, 1960 |